US009226126B1

(12) United States Patent
Wilson et al.

(10) Patent No.: US 9,226,126 B1
(45) Date of Patent: *Dec. 29, 2015

(54) METHOD AND APPARATUS FOR USE OF ALERT TYPE TO CHOOSE CELL-SITE-SELECTION PROCESS FOR SELECTING CELL SITES TO BROADCAST ALERT

(71) Applicant: Sprint Spectrum L.P., Overland Park, KS (US)

(72) Inventors: Patrick D. Wilson, Denver, CO (US); William J. Routt, Danville, CA (US); Piyush Upadhyay, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/482,606

(22) Filed: Sep. 10, 2014

Related U.S. Application Data (63) Continuation of application No. 12/353,665, filed on Jan. 14, 2009, now Pat. No. 8,849,235.

(51) Int. Cl.
*H04M 11/04* (2006.01)
*H04W 4/22* (2009.01)
*H04W 4/02* (2009.01)

(52) U.S. Cl.
CPC .............. *H04W 4/22* (2013.01); *H04W 4/021* (2013.01)

(58) Field of Classification Search
CPC ..... H04W 76/007; H04W 4/22; H04W 16/18; H04W 16/24; H04W 4/14; H04W 4/12
USPC ............................ 455/404.1–404.2, 446, 466
See application file for complete search history.

(56) References Cited

U.S. PATENT DOCUMENTS

| 2004/0103158 | A1* | 5/2004 | Vella et al. ..................... 709/206 |
| 2008/0318596 | A1* | 12/2008 | Tenny ......................... 455/456.2 |
| 2009/0131021 | A1 | 5/2009 | Vogedes et al. |
| 2009/0325538 | A1* | 12/2009 | Sennett et al. ............. 455/404.2 |

* cited by examiner

*Primary Examiner* — Olumide T Ajibade Akonai
*Assistant Examiner* — Matthew Genack (57) ABSTRACT

Disclosed herein is a mechanism for dynamically varying the process of selecting cell sites to broadcast an alert message. The mechanism involves using the type or other characteristic of the alert message as a basis to choose a particular cell-site selection process or level of precision for defining cell site coverage. For example, given one type of alert message, a particular cell-site selection process and/or level of precision may be used to determine the cell sites in the target area, and given another type of alert message, a different cell-site selection process and/or level of precision may be used to determine the cell sites in the target area.

18 Claims, 6 Drawing Sheets

METHOD AND APPARATUS FOR USE OF ALERT TYPE TO CHOOSE CELL-SITE-SELECTION PROCESS FOR SELECTING CELL SITES TO BROADCAST ALERT

BACKGROUND

With the dramatic growth in popularity and use of cell phones in recent years, governmental and commercial entities have sought to leverage the technology by facilitating delivery of real-time alerts to cell phones. These alerts may carry urgent information about events that impact public safety, such as severe weather, criminal activity (e.g., terrorist attack, child abduction, etc.), and/or other situations. Alternatively, the alerts may carry less urgent but still significant information, such as basic information regarding stocks, weather, traffic, or news, or advertisements.

In the United States, for instance, the Federal Communications Commission (FCC) has established a Commercial Mobile Alert System (CMAS) that will help ensure that Americans who subscribe to participating cellular wireless service providers will receive emergency alerts when there is a disaster or other emergency that may impact their lives or well-being. The CMAS defines three classes of alert messages: (i) presidential level, (ii) imminent threat to life and property, and (iii) child abduction emergency (Amber alert). Wireless service providers that implement the CMAS may further leverage the system to additionally deliver (or facilitate delivery of) non-emergency alerts such as those described above.

OVERVIEW

To implement the CMAS, a wireless service provider may operate a gateway ("mobile-alert-system gateway") that will receive an alert message from an alert provider (which will typically but not necessarily be an entity other than the wireless service provider) and will then transmit the alert message to various cell sites for wireless broadcast and receipt by wireless communication devices operating in the affected area (possibly regardless of whether the devices have subscription accounts with the service provider). For this purpose, the alert message received by the gateway may specify a geographic target area (e.g., with data provided in a body or header of the message) in which the alert is to be broadcast. Upon receipt of the alert message, the gateway may then identify a set of cell sites that provide coverage within the geographic target area, and the gateway may send the alert message to those cell sites for wireless broadcast to devices in the target area.

With this process, an issue of precision in defining cell site location exists. In particular, each cell site originates from a base station (typically at a fixed position, but possibly at a variable but currently known position, as in a femotcell or the like). However, the range of coverage of each cell site from its base station may not be a certainty and may vary from cell site to cell site.

If the exact scope of cell site coverage is known for all cell sites in a market, then it would in theory be possible to accurately determine which cell sites the gateway should send a given alert to, for wireless broadcast in a specified geographic target area. The target cell sites could be all cell sites whose coverage exists at least in part in the geographic target area, whose coverage exists entirely within the geographic target area, or a predefined threshold percentage of whose coverage exists within the geographic target area (among other possibilities). With such exact data, a given alert message could be sent with a high degree of certainty to the correct cell sites for wireless broadcast to devices operating in the geographic target area (even though some devices just outside of the target area may also receive the alert message, if target cell sites extend to outside of the target area as well).

Unfortunately, however, such exact data usually does not exist. In a given market, the number and placement of cell sites may vary as new base stations are installed, old base stations are removed, and base station placement changes. Further, the actual range of transmission of a cell site's base station, and thus the actual scope of a cell site's coverage area, may vary or be defined based on various RF propagation factors, such as base station area morphology (e.g., the urban, suburban, rural, or open-area nature of the base station location), base station antenna character (e.g., the antenna gain, tilt, cable/connector losses, noise, sensitivity, etc.), base station height, and base station transmission frequency (possibly multiple frequencies), among possibly others.

For various reasons, a wireless service provider may maintain data that specifies the coverage location of the cell sites in the service provider's network. But these specifications of cell site coverage location may range in level of precision. As one example, for instance, the data may define each cell site coverage to be located generally at the geographic coordinates of the cell site's base station, without regard to the RF range of the cell site. As another example, the data may define each cell site's coverage to be a circle of a particular radius extending from the location of the cell site's base station. In that case, the data may define the same radius for all cell sites, or the data may define the radius for a given cell site as being some portion of a distance between the cell site and an adjacent cell site. Other examples are possible as well.

These specifications or definitions of cell site coverage location may be stored at the wireless service provider's mobile-alert-system gateway so that the gateway can readily determine which cell sites provide coverage in a geographic target area specified for a given alert message. In particular, when the gateway receives an alert message destined for delivery to a given geographic target area (e.g., defined as a polygon or other bounded area), the gateway may then refer to the cell site location data in its internal data storage and readily determine which cell sites have coverage within the geographic target area. The gateway may then send the alert message to each such cell site for wireless broadcast.

Alternatively, the wireless service provider may implement or have access to a system that facilitates more precise (e.g., more real-time) determination of cell site coverage location. Such a system may, for instance, include or have access to the latest data on the actual locations of base stations and actual data regarding RF propagation factors per base station, such as those noted above. In practice, reference to such a system can thus provide more precise definitions of cell site coverage location. Unfortunately, however, accessing such a system may cost more than applying fixed location definition data such the information described in the preceding paragraph for instance. Further, as a general matter, it may be the case that cost may rise as the precision of the cell site coverage location determination increases.

Disclosed herein is a mechanism for dynamically varying the process of selecting cell sites to broadcast an alert message. The mechanism involves using the type or other characteristic of the alert message as a basis to choose a particular cell-site selection process or level of precision for defining cell site coverage. For example, given one type of alert message, a particular cell-site selection process and/or level of precision may be used to determine the cell sites in the target area, and given another type of alert message, a different cell-site selection process and/or level of precision may be used to determine the cell sites in the target area.

The message type of alert messages may define a level of urgency of the alert messages and may thus range from very urgent (e.g., presidential level alert) to not particularly urgent (e.g., basic weather, stocks, advertisements, or other such alerts) or may vary in some other way. Further, the level of precision in cell site coverage location definitions may correlate with the level of urgency, such as by using the most precise level for selecting cell sites to broadcast the most urgent type of message. Similarly, a more expensive or more complex process to determine cell site coverage locations in a more real-time, precise manner may be used for selecting cell sites to broadcast more urgent types of messages.

Thus, for instance, when a gateway receives a highly urgent alert message, the gateway may choose a cell-site-selection process that is more complex and/or expensive and more precise than the gateway would choose for an alert message that is not particularly urgent. By way of example, upon receipt of a highly urgent alert message, the gateway may choose a process that involves querying an external mapping system that takes into consideration recent or current RF propagation factors for various cell sites so as to precisely define the coverage locations of the cell sites and to thereby come to a more precise conclusion about which cell sites provide coverage in the target area at issue, and the gateway may then send the alert message to those cell sites for broadcast. On the other hand, upon receipt of an alert message that is not particularly urgent, the gateway may choose a process that more simply involves dipping into internally stored definitions of base station locations or other predefined cell site coverage locations to make a less precise but still useful determination of which cell sites provide coverage in the target area at issue, and the gateway may send the alert message to those cell sites for broadcast.

With this arrangement, it is believed that the broadcast of more urgent alert messages (or, generally, message of a particular type) can be better focused on the geographic target area, as cell sites selected to broadcast such an alert message would more likely actually provide coverage within the target area. (In the event the selection of cell sites requires a threshold percentage or other threshold extent of each cell site to be within the target area, this is even more the case.) Conversely, it is believed that the broadcast of less urgent alert messages (or, generally, messages of some other type) can be less focused on the geographic target area, as cell sites selected to broadcast such an alert message would be more likely to exist at least in part outside of the target area.

These as well as other aspects, advantages and alternatives will become apparent to those of ordinary skill in the art by reading the following detailed description, with reference where appropriate to the accompanying drawings. Further, it will be understood that this overview and other description provided throughout this document is intended to explain the present method and apparatus merely by way of example and without limitation.

DETAILED DESCRIPTION

Figure 1:
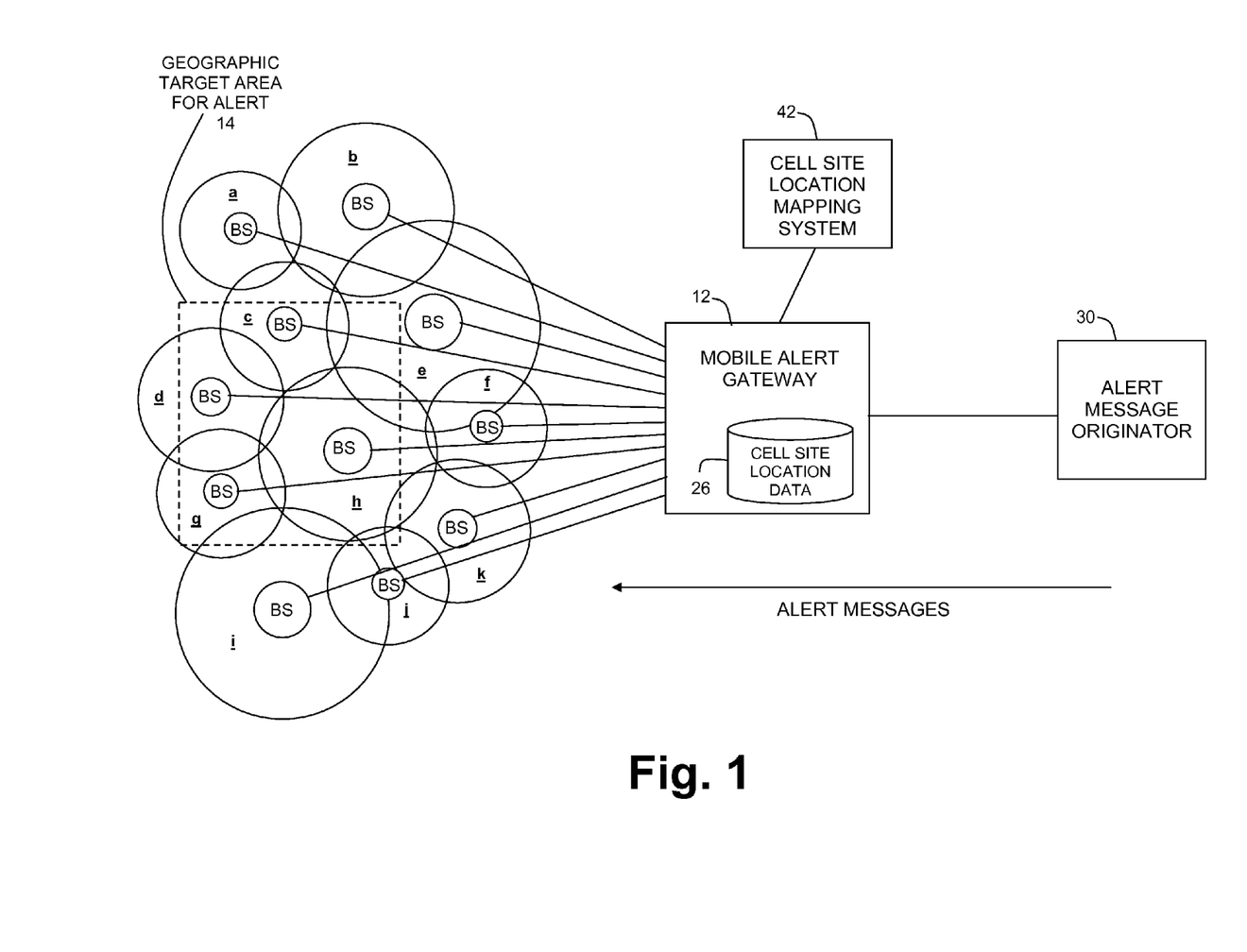
FIG. 1 is a simplified block diagram of a network in which an exemplary embodiment of the method can be implemented.

Referring to the drawings, FIG. 1 is a generalized depiction of a system arranged to implement the present method and apparatus. The system includes at its core a mobile alert gateway 12, which functions to receive an alert message destined for wireless broadcast in a particular geographic target area 14, to determine which cell sites provide coverage in the geographic target area, and to forward the alert messages to those cell sites for wireless broadcast by the cell sites.

FIG. 1 depicts numerous representative cell sites a-k, each being produced by a respective base station (BS). The figure represents each cell site generally by a circle around its respective base station. However, it is understood that the shape and size of cell sites may vary significantly from that shown and may in fact vary over time.

As used herein, the term "cell site" can refer to any wireless coverage area produced by a base station or the like. For instance, a "cell site" can be an entire cell provided by a base station, even though the base station may operatively divide the cell into cell sectors. Alternatively, a "cell site" may be an individual one of multiple cell sectors produced by a base station. In practice, a given base station may provide one or more cell sites, defined by directional radiation elements or through other RF parameters (such as frequency, code modulation, etc.). Further, multiple cell sites may overlap to any extent and may in some cases be coterminous.

Each base station preferably comprises an antenna arrangement (typically, but not necessarily, tower mounted), a power amplifier, and perhaps other transceiver equipment, so that the base station can engage in RF communication with a radiation pattern defining one or more cell sites. Preferably, each cell site in the system will have a unique address or other identifier, so that communications can be routed to a desired cell site by transmission to the cell site's serving base station.

Mobile alert gateway 12 is shown having communication links with each base station. In practice, these may not be individual links as shown but may be links to aggregation points such as mobile switching centers, radio network controllers, base station controllers, or the like, each of which may in turn connect with multiple base stations. The links shown in FIG. 1 are provided to illustrate conceptually that one or more communication paths exist over which the the mobile alert gateway can forward alert messages to particular cell sites by sending the alerts to the base stations that serve those cell sites.

Figure 2:
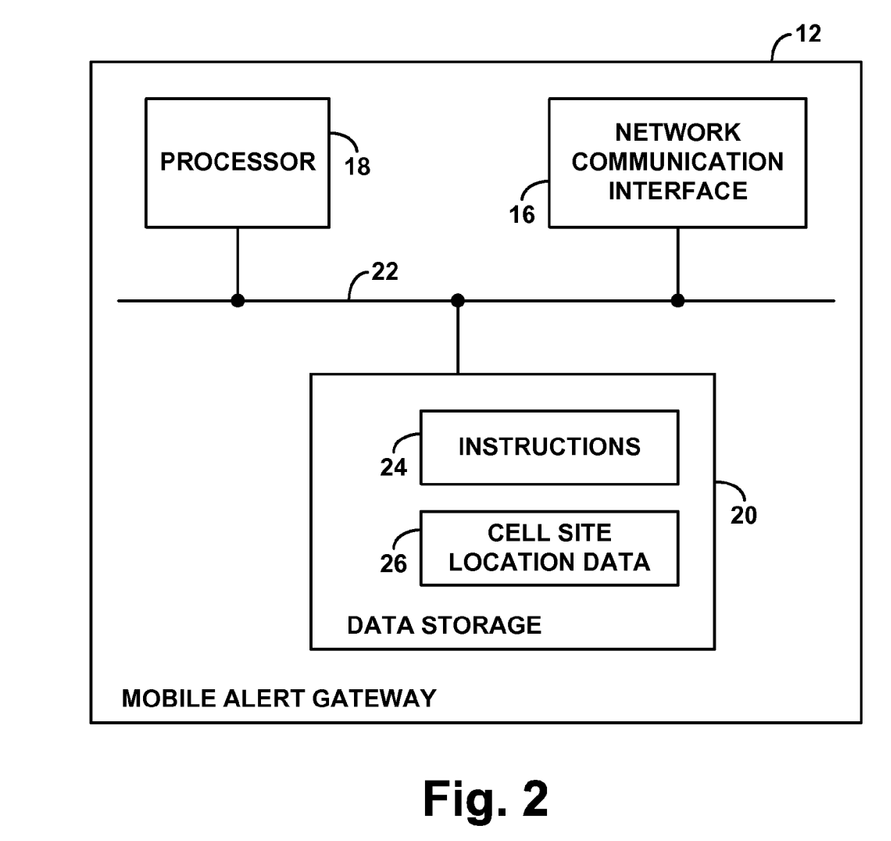
FIG. 2 is a simplified block diagram of a gateway or other representative machine arranged to implement the exemplary method.

Mobile alert gateway 12 may take the form of a computer server programmed to carry out the functions described herein, and will include various physical components to facilitate implementation of those functions. Turning briefly to FIG. 2, a simplified block diagram of an example mobile alert gateway 12 is shown.

As illustrated in FIG. 2, the example mobile alert gateway 12 includes a network communication interface 16, a processor 18, and data storage 20, all of which may reside in a gateway housing and may be coupled together by a system bus or other connection mechanism 22.

Network communication interface 16 may comprise one or more wired or wireless Ethernet connection module and/or other communication modules adapted for connection to one or more communication links, through which the mobile alert gateway can receive alert messages and send the alert messages to appropriate cell sites for wireless broadcast, and through which the mobile alert gateway may engage in other external communications. Although only one network communication interface block is shown in the figure, it will be understood that the mobile alert gateway can have multiple network communication interfaces, such as one or more operative to receive alert messages, one or more operative to send received alert messages to appropriate cell sites, and perhaps others for other purposes.

Processor 18 may comprise one or more general purpose processors (e.g., INTEL microprocessors) and/or one or more special purpose processors (e.g., application specific integrated circuits). Data storage 20 may in turn comprise one or more volatile and/or non-volatile storage components, such as magnetic, optical, or organic storage, and may be integrated in whole or in part with processor 18. Data storage 20 preferably holds machine language instructions 24 executable by processor 18 to carry out various functions described herein. Alternatively, a special purpose processor or other technology may be arranged to implement those functions. Further, data storage 20 preferably contains cell site location data 26 that defines cell site coverage locations, such as base station locations, cell site radii, or the like. Such data may be pre-provisioned or periodically re-provisioned into the mobile alert gateway to enable the gateway to determine which cell sites provide coverage within a designated geographic target area.

In practice, the mobile alert gateway 12 may be operated by or for a cellular wireless service provider that also operates the base stations. Thus, the mobile alert gateway 12 may sit on a core network operated by the wireless service provider or may be otherwise connected with the service provider's system. Further, the mobile alert gateway 12 may or may not be integrated with one or more other components of the wireless service provider's network. For instance, the mobile alert gateway may or may not be integrated with a packet data serving node, radio network controller, base station controller, mobile switching center, mobile positioning center, short messaging service center, or other equipment operated by or for the wireless service provider.

Alternatively or additionally, the mobile alert gateway may be operated by a third party that has an arrangement with multiple cellular wireless service providers, to facilitate delivery of alert messages to base stations operated by the multiple service providers. Such a third party gateway can advantageously enable wireless broadcast of alert messages in a geographic target area via base stations of multiple service providers, which may facilitate receipt of the alert messages by wireless communication devices served by multiple service providers rather than just one service provider.

FIG. 1 further depicts an alert message originator 30, which may comprise a computer server or other communication equipment that is arranged to provide an alert that is to be wirelessly broadcast in a particular geographic target area. The alert message originator 16 may be a computer server or other communication device that provides an alert for wireless broadcast in a defined geographic target area. The alert message originator 16 may be operated by a governmental entity, a commercial business, and/or any other entity that is interested in having an alert be broadcast in a particular geographic area.

A communication link is provided between the alert message originator 30 and the mobile alert gateway 12. This link, like others in the figure, may take various forms (the details of which are not critical) and may include any number of components, including wired, wireless, circuit-switched, packet-switched components, direct, and networked components. By way of example, link between the alert message originator 30 and the mobile alert gateway 12 may comprise a packet-switched network such as the Internet. In that case, the alert message originator 30 may send the alert message to the mobile alert gateway 12 as a packet-data communication, such as an IP communication. For instance, the alert message originator 16 may transmit the alert message as an IP multicast transmission to a multicast IP address, and the mobile alert gateway 12 may be a member of the multicast group set to receive and process communications to that multicast IP address. Beneficially with that arrangement, the alert message could be readily delivered to multiple mobile alert gateways, in various areas or associated with various wireless service providers, for transmission in turn to appropriate cell sites. Other types of communication links are possible as well.

Figure 3:
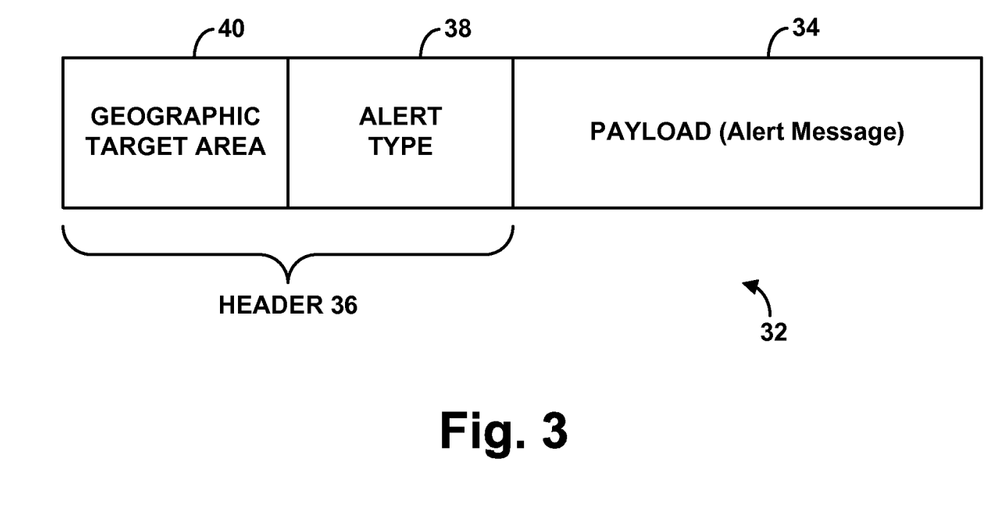
FIG. 3 is a simplified diagram of an alert message that may be received by the machine of FIG. 2 and forwarded to a set of cell sites for wireless broadcast.

When alert message originator 30 provides an alert message for receipt by mobile alert gateway 12, the alert message originator will preferably include in the alert message, in addition to the alert itself, various information that will facilitate implementation of the present method. In particular, the alert message originator 30 will preferably include in the alert message (e.g., in a body of the message or in a header accompanying the message) both an indication of the alert type and a specification of the geographic target area for the alert message. FIG. 3 depicts a simplified example of such an alert message 32.

As shown in FIG. 3, the example alert message includes a payload portion 34, which includes the alert itself or a reference to the alert, such as text describing the alert. In turn, the example message includes a header portion 36 that includes (i) a specification of the alert type 38 and (ii) a specification of the geographic target area 40. Alternatively, these pieces of information can be provided in the payload portion of the message. Still alternatively, the alert, the type, and the target area specification, can be arranged in any other agreed manner in the alert message, as long as the mobile alert gateway or other such entity is arranged to be able to discern at least the alert type and the geographic target area from the message.

The specification of alert type 38 preferably indicates a class of the alert or may indicate some other characteristic of the alert itself. Example classes include those described above, namely, (i) presidential level, (ii) imminent threat to life and property, (iii) child abduction emergency (Amber alert), and (iv) non-emergency/commercial, among other possible classes now known or later developed.

The specification of geographic target area describes the geographic target area in which the alert message is to be wirelessly broadcast. The target area may be described in various ways. As one example, the target area may be described as a particular region such as a city, county, state, or nation, which may then leave to the mobile alert gateway 12 the task of determining the geographic scope of that region, by referring to internally stored mapping data or an external mapping system. Alternatively, the target area may be described more precisely as a polygon or other shape based on geographic coordinates. For instance, the target area may be described as a polygon by describing latitude and longitude coordinates defining the corners or points of the polygon. Or the target area may be described as an ellipse having one or more specified radii and centered about a particular latitude/longitude point. Other examples of target area specifications are possible as well.

In FIG. 1, mobile alert gateway 12 is shown including (in internal data storage) the cell site location data 26 described above. This cell site location data may provide rudimentary or relatively low-precision indications of cell site coverage locations. For instance, the cell site location data may include a table listing each cell site (keyed to its unique address or other identifier) and specifying for each cell site the geographic coordinates of the cell site's base station. Further, the table may specify for each cell site a radius of the coverage area of the cell site, ideally centered about the specified base station location. Further, the table may include other sorts of cell site coverage location specifications. Alternatively, the table may merely specify base station locations, and, for simplicity, the mobile alert gateway may be set to treat all base station as having the same radius of coverage.

As noted above, the cell site location data 26 may be pre-provisioned and re-provisioned in the mobile alert gateway. Initially, a wireless service provider may load the mobile alert gateway with this data based on established records of where the service provider's base stations are located and what range of coverage is provided by each base station (as established through drive testing or other mechanisms). As the wireless service provider changes the configurations of its base stations, such as by adding base stations, removing base stations, or changing parameters of particular base stations, and as the wireless service provider learns of new coverage scope of particular base stations, the wireless service provider may update the cell site location data 26 at the mobile alert gateway.

Likewise, to the extent any of the base stations are portable (as femtocells for instance), the base stations may be arranged to automatically report their locations to a network server when initially powered on and/or at other times, and that network server may be arranged to report those locations to the mobile alert gateway, to update the cell site location data 26. The range of coverage of certain base stations may be presumed based on the type of base stations. (For instance, femtocells may have a presumed range of coverage), and so the network server or mobile alert gateway may list in the cell site location data 26 the applicable range of coverage or may assume the range if the table indicates the type of base station.

FIG. 1 further depicts a cell site location mapping system 42 located external to the mobile alert gateway. The cell site location mapping system 42 (such as the well known PLANET system for instance) may be a computer system that functions to provide more precise, perhaps more real-time indications of cell site coverage location. For instance, the cell site location mapping system 42 may have access to RF parameters of various base stations and may thereby have more specific information about the range of coverage of various cell sites. Further, the cell site location mapping system 42 may receive and maintain more current information about the locations of base stations, the additions of base stations, the removal of base stations, and the like and may thus generally provide more precise information about cell site coverage location than the cell site location data 26 maintained internally the mobile alert gateway.

As discussed above, it may be quicker and less expensive for the mobile alert gateway to refer to its internal cell site location data 26 to determine which cell sites provide coverage within a designated geographic target area than for the mobile alert gateway to query an external system such as system 42 for instance. This difference may be due to per-dip costs imposed by an operator of the external mapping system or to the processing or time involved in communications between the mobile alert gateway and the external system. Therefore, it may sometimes be preferable for the mobile alert gateway to use its internal data as the basis to determine which cell sites to send a given alert to. But in other situations, it may be preferable for the mobile alert gateway to make use of the external mapping system 42 to determine which cell sites should broadcast the alert. According to the present method, the choice between those two possibilities, and/or the choice of the level of precision of cell site location determination, will be based at least on part on the type of alert message at issue.

Considering the base station arrangement and geographic target area 14 shown in FIG. 1, the relevance of level of precision becomes clear. As illustrated, geographic target area 14 encompasses the base stations of cell sites c, d, g, and h. If mobile alert gateway 12 were to merely use base station location as the indicator of cell site coverage location, the mobile alert gateway may therefore determine that the only cell sites providing coverage within the geographic target area 14 are cell sites c, d, g, and h. Thus, given an alert message destined to target area 14, the mobile alert gateway would send the alert message to the base stations of cell sites c, d, g, and h. In reality (if we consider the circles to represent actual cell site coverage), however, as can be seen in the figure, cell sites e, i, j, and k also provide some coverage within geographic target area 14. Thus, faced with an alert message that is very important to be broadcast in geographic target area 14, it may be best to provide the alert in cell sites e, i, j, and k as well as cites c, d, g, and h. However, in order to determine which cell sites provide coverage that extends into the geographic target area, more precise cell site coverage data would be necessary. Furthermore, if the system is configured to treat a cell site as being within the geographic target area if at least a threshold portion of the cell site exists within the geographic target area, precision in defining the cell site coverage location (including the shape, size, and position of the cell site) becomes even more important.

Ultimately, the more urgent the message, the more useful it may be for the mobile alert gateway to refer to more precise cell site coverage data, even if it means increased cost to obtain the cell site location information. Conversely, if an alert message is not particularly urgent, it may be alright for the mobile alert gateway to make the decision based on less precise and/or perhaps less current data regarding cell site coverage locations.

Figure 4:
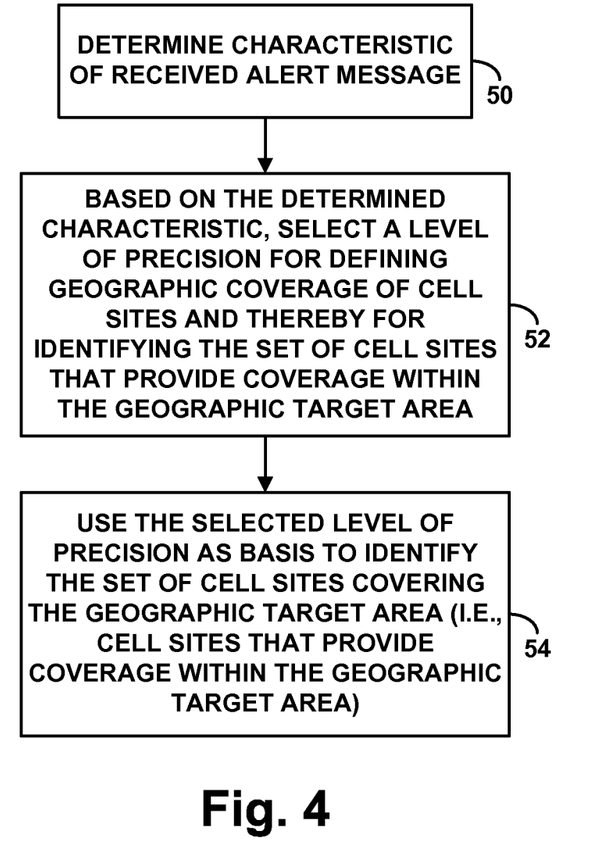
FIG. 4 is a flow chart depicting functions that can be implemented in accordance with the present method.

FIG. 4 is next a flow chart depicting by way of example a set of functions that can be implemented in accordance with the present method. The depicted method may be carried out in a system in which an entity receives an alert message for wireless broadcast over a geographic target area, the entity identifies a set of cell sites that provide coverage within the geographic target area, and the alert message is then provided to the cell sites of the identified set for wireless broadcast.

As illustrated in FIG. 4, the method begins at step 50 by determining a characteristic of the received alert message. This function may involve determining a type of the alert, as indicated in a header or as otherwise expressly or inherently indicated by or with the alert message. In particular, this function may involve the mobile alert gateway or another entity reading the alert type from the alert message (e.g., payload) or from a header of the alert message or otherwise discerning the alert type.

At step 52, the method then involves, based on the determined characteristic, selecting a level of precision for defining geographic coverage of cell sites and thereby for identifying the set of cell sites that provide coverage within the geographic target area. This selection level of precision, which could be carried out by mobile alert gateway 12 for instance, may involve selecting a particular method of determining cell site coverage locations, with the possible methods ranging in degree of precision. As such, a more precise mechanism may be selected when the alert is more urgent, and a less precise mechanism may be selected when the alert is less urgent.

Thus, the method may involve receiving a high urgency alert message and selecting a relatively high precision definition of cell site coverage locations for purposes of identifying cell sites in the target area specified for that alert message, and the method may involve separately receiving a low urgency alert message and selecting a relatively low precision definition of cell site coverage locations for purposes of identifying cell sites in the target area specified for that alert message. In practice, for instance, the possible types of alert messages may range from a most urgent type to a least urgent type, and the level of precision that is selected may have a range corresponding with the range of urgency, such that a highest level of precision corresponds with the most urgent type of alert and a lowest level of precision corresponds with the least urgent type of alert. For example, a more precise level of cell site coverage location definition can be used for presidential level alerts than for Amber alerts, and a more precise level of cell site coverage location definition can be used for Amber alerts than for commercial alerts.

At step 54, the method then involves using the selected level of precision as a basis to identify the set of cell sites covering the geographic target area (i.e., cell sites that provide coverage within the geographic target area). This function could be carried out by the mobile alert gateway 12 and/or an external system such as cell site location mapping system 42, with the choice of whether to carry out the function internally or to involve external system 42 possibly being made based on the type of the alert message as well, considering factors such as those described above for instance.

For example, for one or more types of alerts, the mobile alert gateway may programmatically refer to its own internally stored cell site location data to determine which cell sites provide coverage within the geographic target area. For a low urgency alert (e.g., a commercial alert such as a basic weather, stock, or news alert), the mobile alert gateway may refer to coverage location data in the form of simple base station locations. As discussed above, such coverage location data might be fairly imprecise. On the other hand, for a slightly more urgent but still not very urgent alert message, the mobile alert gateway may refer to coverage location data in the form of base station locations and coverage radii, whether specific to cell sites or the same for all cell sites. This coverage location data may be a bit more precise and thus provide for a bit more focused alert distribution.

As another example, for other types of alerts, the mobile alert gateway may query an external cell site mapping system such as system 42, either to find out the locations of cell site coverage areas and to then compare those coverage area locations with the geographic target area specification, or to have the system 42 itself perform a comparison of cell site coverage location with the geographic target area specification and return to the mobile alert gateway an indication of cell sites that provide coverage in the geographic target area.

Thus, for instance, the mobile alert gateway may request from system 40 the most current data regarding cell site coverage locations for numerous cell sites in a given market and, upon receipt of that data from system 42, may compare that data with the geographic target area specification so as to determine which cell sites provide coverage within the target area. Or perhaps more simply, the mobile alert gateway may send the target area specification to system 42, and system 42 may perform the comparison and reply to mobile alert gateway with a list of cell sites that provide coverage in the target area. To facilitate the latter process, the mobile alert gateway may also provide system 42 with an indication of the alert type or of the determined level of precision, and system 42 may itself select a mechanism for cell site coverage location determination in line with the applicable level of precision.

The act of determining that a given cell site provides coverage within a specified geographic target area may involve determining that the base station of the cell site exists within the geographic target area, determining that any portion of the cell site extends into the geographic target area, determining that all of the cell site exists within the geographic target area, or determining that at least a threshold portion (e.g., percentage) of the cell site exists within the geographic target area. Further, for cell sites that may have variable coverage, the determination may be based on a statistical analysis of how often the cell site provides coverage within the geographic target area. Other factors may be considered as well.

By applying this method, the decision of which cell sites provide coverage in the specified geographic target area, and thus the result of which cell sites will receive and broadcast the alert message, will vary based on the determined type or other characteristic of the alert message. Preferably, distribution of alert messages that are more urgent will end up being more well focused on the geographic target area of interest, whereas distribution of alert messages that are less urgent may be less focused on the target area, albeit at a possibly lower cost.

Figure 5:
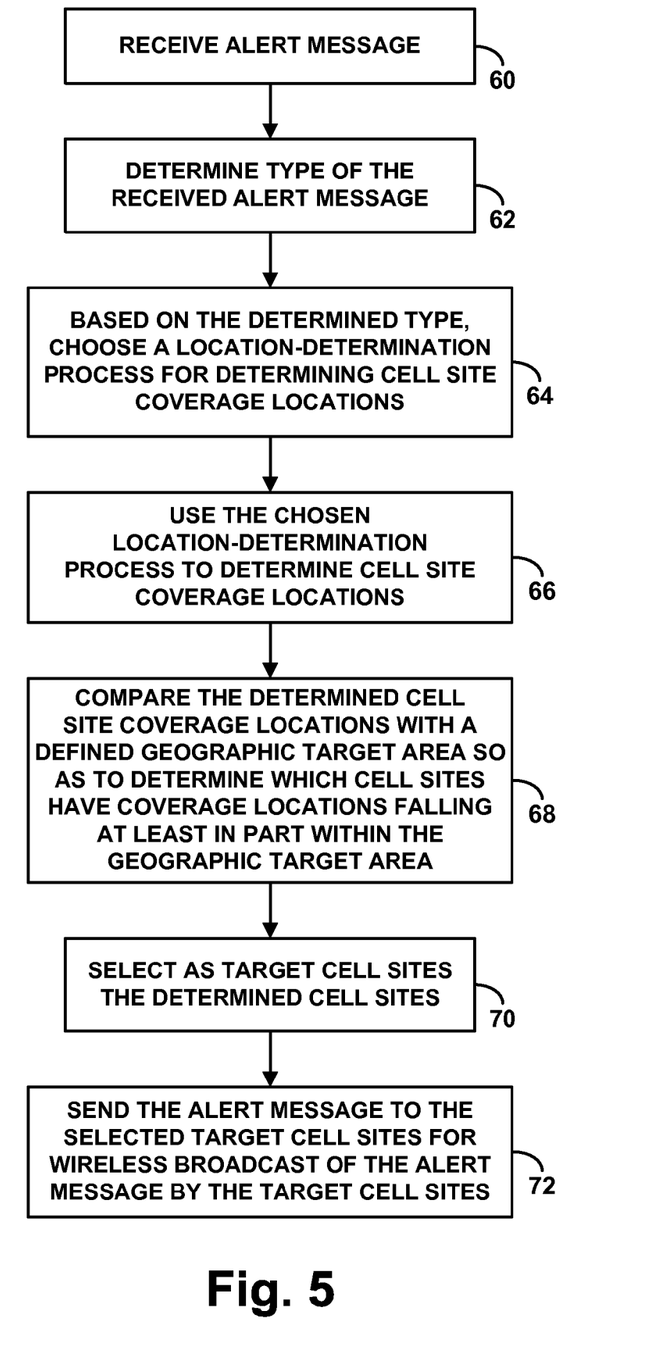
FIG. 5 is another flow chart depicting functions that can be implemented in accordance with the present method.

FIG. 5 is next a flow chart depicting in alternative manner a set of functions that can be carried out by a machine such as mobile alert gateway 12 for instance. At step 60, a communication interface of the machine receives an alert message. At step 62, the machine determines a type of the alert message, such as by reading the type from the message/header. At step 64, based on the determined type, the machine chooses a location-determination process for determining cell site coverage locations. At step 66, the machine uses the chosen location-determination process to determine cell site coverage locations. At step 68, the machine compares the determined cell site coverage locations with a defined geographic target area so as to determine which cell sites have coverage locations falling at least in part within the geographic target area. At step 70, the machine then selects as target cell sites the determined cell sites. And at step 72, the machine sends the alert message to the target cell sites for wireless broadcast of the alert message by the target cell sites.

In this method, the machine is preferably arranged to choose as the location-determination process a first location-determination process when the determined type is a first type, and to choose as the location-determination process a second location-determination process different than the first location-determination process when the determined type is a second type different than the first type. For instance, the first type may be more urgent than the second type, and the first process may determine cell site locations more precisely than the second process. Alternatively or additionally, the first process may involve the machine determining cell site locations by reference to cell site coverage location data stored at the machine without querying any external cell site coverage mapping system, and the second process may involve the machine querying an external cell site coverage mapping system to facilitate determination of cell site coverage locations.

Further, the first process may involve the machine considering as the location of each cell site a location of a base station that radiates to define the cell site, without regard to a range of coverage of the cell site. And the second process may involve the machine considering as the location of each cell site a circle of a defined radius extending from the location of the base station that radiates to define the cell site.

Still further, the machine may be arranged to choose as the location-determination process a third location-determination process different than the first and second location-determination processes when the determined type is a third type different than the first and second types. In that case, by way of example, the first process may involve the machine considering as the location of each cell site a location of a base station that radiates to define the cell site without regard to range of coverage of the cell site, the second process may involve the machine considering as the location of each cell site a circle of a predefined radius extending from a location of the base station that radiates to define the cell site without regard to RF propagation of the cell site, and the third process may involve using RF propagation data to determine a radius of coverage of each cell site and considering as the location of each cell site a circle of the determined radius extending from the location of the base station that radiates to define the cell site. As noted above, the chosen location-determination process may or may not then involve the machine querying an external cell site mapping system to determine cell site coverage locations.

Figure 6:
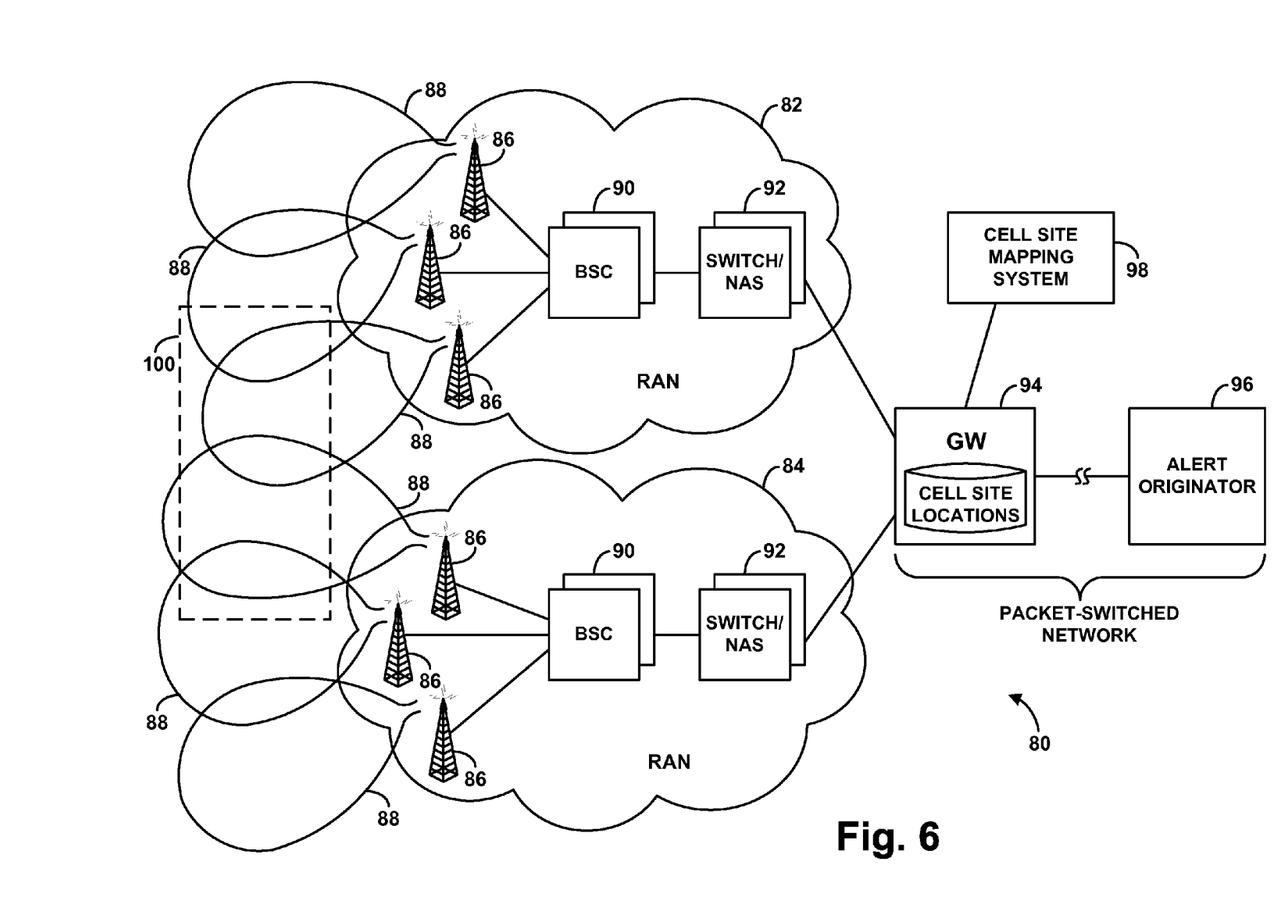
FIG. 6 is a simplified block diagram of an example cellular wireless communication system with respect to which an exemplary method and apparatus can be implemented.

Lastly, FIG. 6 depicts an example of a cellular wireless communication system 80 with respect to which the exemplary method and apparatus can be implemented. The system 80 includes two representative radio access networks (RANs) 82, 84 which may be operated by the same or different wireless service providers. Each RAN can generally take any form, ranging from a simple wireless access point router to a far more complex arrangement. As shown by way of example, each RAN includes multiple base stations 86, each radiating to define one or more cell sites 88.

Further each RAN includes one or more base station controllers (BSCs) 90 that generally control the base stations and manage aspects of air interface operation (such as handoff of devices from one cell site to another). Each BSC may then be coupled with a switch and/or network access server (NAS) 92 that provides connectivity with a transport network. For instance, each BSC may be coupled with a mobile switching center that provides connectivity with the public switched telephone network (PSTN) so that served devices can engage in PSTN calls. Further, each BSC may be coupled with a packet data serving node that provides connectivity with a packet-switched network such as a service provider's core network and/or the Internet, so that served devices can engage in packet-based communications (such as IP communication).

FIG. 6 depicts a mobile alert gateway 94 in communication with each RAN. The mobile alert gateway may, for instance, reside on a packet-switched network and communicate with the PDSN of each RAN, or the gateway may be connected or integrated in some other manner. Further, FIG. 6 depicts an alert message originator 96 having a communication link with the mobile alert gateway, and a cell site mapping system 98 accessible to the mobile alert gateway.

With this arrangement, alert message originator 96 may send an alert message that would be received by mobile alert gateway 94 and that would specify a geographic target area 100 and an alert type. Mobile alert gateway 94 may then apply the method described above to determine which cell sites provide coverage in the geographic target area and may then send the alert to those cell sites for wireless broadcast.

In practice, the mobile alert gateway may send the alert message to the cell sites by sending the alert message to the base stations that serve the cell sites, in a manner that will cause the base stations to broadcast the message over the air. For instance, the gateway may send the alert message to a node in each RAN and designate the address or other identifier of each destination base station. Program logic in each RAN may then route the alert message to each designated destination base station. And each such base station may then broadcast the alert message for receipt by wireless communication devices in the base station's cell site.

A base station may broadcast an alert message on an overhead control channel such as a paging channel or over a dedicated broadcast channel, or the base station may broadcast the alert message in any other manner. Wireless communication devices operating in the base station's cell site may then receive the alert message and present the alert to their users, so that the users will benefit from receiving the alert applicable to their geographic area.

An exemplary embodiment of the present method has been described above. Those of ordinary skill in the art will appreciate, however, that changes from the embodiment are possible, while remaining within the scope of the claims.

The invention claimed is:

1. A machine comprising:
    a communication interface arranged to receive an alert message and to send the alert message to a set of cell sites for the cell sites to wirelessly broadcast the alert message in a defined geographic target area, wherein each cell site has a respective coverage location; and
    wherein the machine is arranged to determine a type of the alert message and, based on the determined type, to choose a location-determination process for determining cell site coverage locations, to use the chosen location-determination process to determine cell site coverage locations, to compare the determined cell site coverage locations with the geographic target area so as to determine which cell sites have coverage locations falling at least in part within the geographic target area, to select as the set of cell sites the determined cell sites, and to send the alert message to the cell sites of the selected set for wireless broadcast of the alert message by the cell sites of the selected set,
    wherein the machine is arranged to choose as the location-determination process a first location-determination process when the determined type is a first type, and to choose as the location-determination process a second location-determination process different than the first location-determination process when the determined type is a second type different than the first type,
    wherein the first location-determination process involves the machine considering as the coverage location of each cell site a location of a base station that radiates to define the cell site, without regard to a range of coverage of the cell site, and
    wherein the second location-determination process involves the machine considering as the coverage location of each cell site (i) the location of the base station that radiates to define the cell site and (ii) the range of coverage of the cell site.

2. The machine of claim 1, wherein the machine is a mobile-alert-system gateway operated by a cellular service provider, wherein the cellular service provider also operates the cell sites.

3. The machine of claim 1, wherein the first type is a more urgent type than the second type, and wherein the first location-determination process determines cell site locations more precisely than the second location-determination process.

4. The machine of claim 1,
wherein the first location-determination process involves the machine determining cell site coverage locations by reference to cell site coverage location data stored at the machine, without querying any external cell site coverage mapping system, and
wherein the second location-determination process involves the machine querying an external cell site coverage mapping system to determine cell site coverage locations.

5. The machine of claim 4, further comprising:
data storage; and
the cell site coverage location data, wherein the cell site coverage location data is stored in the data storage.

6. The machine of claim 1,
wherein the second location-determination process involves the machine considering as the coverage location of each cell site a circle of a defined radius extending from the location of the base station that radiates to define the cell site.

7. The machine of claim 6, wherein the defined radius is the same for each cell site.

8. The machine of claim 6, wherein the defined radius is cell site specific.

9. The machine of claim 1, wherein received alert message or a header thereof specifies the type of alert, and wherein the machine is arranged to determine the type by reading the type from the alert message or from the header thereof.

10. The machine of claim 1, wherein the type is one of (i) presidential level alert, (ii) imminent-threat alert, (iii) Amber alert, and (iv) commercial alert.

11. A method comprising:
receiving into a machine an alert message to be broadcast in a defined geographic target area, wherein the alert message is of a type selected from the group consisting of a first type and a second type, the first type being different than the second type;
determining by the machine the type of the received alert message and, based on the determined type, choosing by the machine a location-determination process for determining cell site coverage locations, wherein (i) if the type is the first type, then the machine chooses as the location-determination process a first location-determination process that involves considering as the coverage location of each cell site a location of a base station that radiates to define the cell site, without regard to a range of coverage of the cell site, and (ii) if the type is the second type, then the machine chooses as the location-determination process a second location-determination process that involves instead considering as the coverage location of each cell site the location of the base station that radiates to define the cell site and the range of coverage of the cell site;
using by the machine the chosen location-determination process to determine cell site coverage locations;
comparing by the machine the determined cell site coverage locations with the geographic target area so as to determine which cell sites have coverage locations falling at least in part within the geographic target area; and
sending the alert message to the determined cell sites for wireless broadcast of the alert message by the determined cell sites.

12. The method of claim 11, wherein the type is selected from the group consisting of (i) presidential level alert, (ii) imminent-threat alert, (iii) Amber alert, and (iv) commercial alert.

13. The method of claim 11,
wherein the first location-determination process involves the machine determining cell site coverage locations by reference to cell site coverage location data stored at the machine, without querying any external cell site coverage mapping system, and
wherein the second location-determination process involves the machine querying an external cell site coverage mapping system to determine cell site coverage locations.

14. The method of claim 11,
wherein the second location-determination process involves the machine considering as the coverage location of each cell site a circle of a defined radius extending from the location of the base station that radiates to define the cell site.

15. The method of claim 14, wherein the defined radius is the same for each cell site.

16. The method of claim 14, wherein the defined radius is cell site specific.

17. The method of claim 11, wherein received alert message or a header thereof specifies the type of alert, the method further comprising determining the type by reading the type from the alert message or from the header thereof.

18. The method of claim 11, wherein the machine is a mobile-alert-system gateway operated by a cellular service provider, wherein the cellular service provider also operates the cell sites.

* * * * *